(12) United States Patent
Takahashi

(10) Patent No.: US 6,267,454 B1
(45) Date of Patent: Jul. 31, 2001

(54) METHOD OF CONTROLLING BRAKE FORCE

(75) Inventor: Kimio Takahashi, Tokyo (JP)

(73) Assignee: Akebono Brake Inudstry Co., Ltd., Tokyo (JP)

( * ) Notice: Subject to any disclaimer, the term of this patent is extended or adjusted under 35 U.S.C. 154(b) by 0 days.

(21) Appl. No.: 09/317,849

(22) Filed: May 25, 1999

(30) Foreign Application Priority Data

May 26, 1998 (JP) .................................................. 10-143790

(51) Int. Cl.⁷ ....................................................... B60T 13/00
(52) U.S. Cl. .............................................. 303/9.71; 303/186
(58) Field of Search .................................... 303/166, 167, 303/DIG. 3, DIG. 4, 113.5, 155, 186, 187, 193, 9.71, 9.62; 188/72.1, 71.8

(56) References Cited

U.S. PATENT DOCUMENTS

| 4,623,044 | * | 11/1986 | Ohta et al. ......................... | 188/72.1 |
| 5,107,967 | | 4/1992 | Fujita et al. ....................... | 188/72.1 |
| 5,163,743 | * | 11/1992 | Leppek et al. .................... | 303/155 |
| 5,234,262 | * | 8/1993 | Walenty et al. ................... | 303/155 |
| 5,401,082 | * | 3/1995 | Fuchs et al. ...................... | 303/187 |
| 5,574,644 | * | 11/1996 | Butsuen et al. ................... | 180/169 |
| 5,646,849 | * | 7/1997 | Walenty et al. ................... | 303/155 |
| 5,855,419 | * | 1/1999 | Urai et al. ......................... | 303/186 |
| 6,017,101 | * | 1/2000 | Matsuda ............................ | 303/193 |

FOREIGN PATENT DOCUMENTS 3-41233  2/1991 (JP) .

* cited by examiner

Primary Examiner—Robert J. Oberleitner
Assistant Examiner—Mariano Sy
(74) Attorney, Agent, or Firm—Morgan, Lewis & Bockius LLP

(57) ABSTRACT

A method of controlling a brake force in a brake system including a front wheel system and a rear wheel system, includes the steps of: operating a brake in the front wheel system by using a hydraulic pressure corresponding to an amount of brake pedal operation; and controlling a wheel speed of the rear wheel system via a feedback mechanism to match a wheel speed of the front wheel system.

11 Claims, 4 Drawing Sheets

METHOD OF CONTROLLING BRAKE FORCE

This Application claims the benefit of Japanese Application No. Hei 10-143790 filed on May 26, 1998, which is hereby incorporated by reference.

BACKGROUND OF THE INVENTION

1. Field of the Invention

The present invention relates to a brake system, and more particularly, to a method of controlling a brake force in a brake system including a front wheel system and a rear wheel system.

2. Description of the Related Art

An example of an electrically operated brake used for a vehicle is disclosed in Japanese Unexamined Patent Publication No. 3-41233 (corresponding to U. S. Pat. No. 5,107,967). This electrically operated brake operates as described below. In order to generate the required brake force, torque of an electric motor is transmitted to a brake friction pad via a worm mechanism for converting a rotary motion into a linear motion. As a result, the brake force is applied to the vehicle. At this time, the brake force is controlled in such a manner that a rotary angle of the electric motor is detected by an encoder and the position of the brake friction pad is controlled according to the rotary angle.

In another example of an electrically operated brake used for a vehicle, instead of the rotary angle of the electric motor, the pushing force of the brake friction pad is detected by a sensor. The brake force is then controlled by the detected pushing force.

However, the above braking devices have the following problems. The encoder for detecting a rotary angle of the motor and the brake friction pad pushing force sensor for detecting a pushing force of the brake friction pad are arranged in each braking device of the front and the rear wheels. In other words, the encoder and the brake friction pad pushing force sensor must be arranged in each of the four braking devices of a vehicle. This allows the brake force of each braking device to be controlled by an electronic control unit according to an output signal sent from each encoder and sensor. Since each sensor must be arranged in a brake caliper, the sensor has to be able to resist rough conditions such as high temperatures and intense vibrations. As a result, the cost of the sensor is raised. It is difficult to reduce the overall cost of the braking device.

SUMMARY OF THE INVENTION

Accordingly, the present invention is directed to a method of controlling brake force in a brake system that substantially obviates one or more of the problems due to limitations and disadvantages of the related art.

An object of the present invention is to provide a method of controlling brake force which results a brake system with a reduced overall cost.

Another object of the present invention is to provide a method of controlling brake force which requires a sensor to be installed only in the front wheel system and not in the rear wheel system.

A further object of the present invention is to provide a method of controlling brake force in a brake system including a front wheel system and a rear wheel system, and a wheel speed of one system is used as a target speed and a wheel speed of the other system is controlled by a feedback mechanism based on the target speed.

Additional features and advantages of the invention will be set forth in the description which follows, and in part will be apparent from the description, or may be learned by practice of the invention. The objectives and other advantages of the invention will be realized and attained by the structure particularly pointed out in the written description and the claims hereof as well as the appended drawings.

To achieve these and other advantages and in accordance with the purpose of the invention, as embodied and broadly described, the present invention provides a method of controlling the brake force in a brake system including a front wheel system and a rear wheel system. In the front wheel brake system, the brake force is generated and controlled by utilizing information sent from a brake friction pad pushing force sensor corresponding to the operation force given to a brake pedal. In the rear wheel brake system, a feedback control is conducted so that a wheel speed of the rear wheel can follow a wheel speed of the front wheel. Accordingly, it is unnecessary to provide a brake friction pad pushing force sensor in the rear wheel system of the brake system. Therefore, it is possible to reduce the cost of the overall braking system.

In another aspect, in the present invention, a method of controlling brake force in a brake system composed of two systems of a front wheel system and a rear wheel system, includes the steps of: operating a brake by hydraulic pressure corresponding to an amount of brake operation in the front wheel system when the brake is applied; and conducting feedback control so that a wheel speed of the rear wheel system can be fed back aiming at a wheel speed of the front wheel system.

In a further aspect, in the present invention, a method of controlling brake force in a brake system composed of two systems of a front wheel system and a rear wheel system, includes the steps of: setting a target hydraulic pressure $P_o$ corresponding to an amount of application of a brake pedal in the front wheel system when the brake is applied; finding actual hydraulic pressure $P_w$ of the brake of the front wheel; finding a difference $(\Delta P = P_o - P_w)$ between target hydraulic pressure $P_o$ and actual hydraulic pressure $P_w$ of the brake; controlling the brake force of the front wheel so that the difference can be zero; taking in actual wheel speed $V_{wf}$ of the front wheel and actual wheel speed $V_{wr}$ of the rear wheel; and controlling the brake force of the rear wheel so that a difference $(\Delta V_w = V_{wf} - V_{wr})$ between the actual wheel speed of the front wheel and the actual wheel speed of the rear wheel can be zero.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
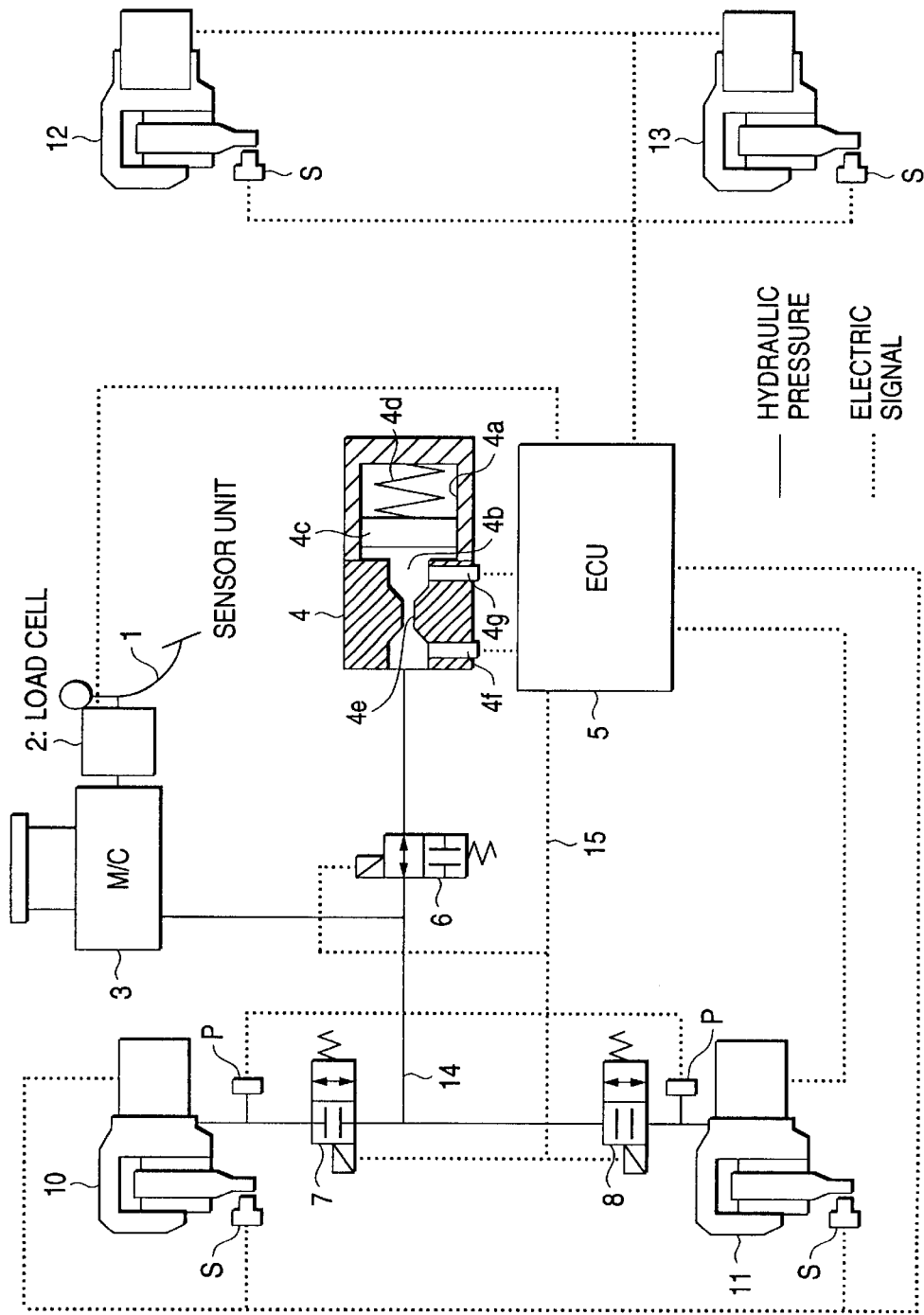
FIG. 1 is an arrangement view of a brake control device of one embodiment of the present invention.

FIG. 1 illustrates an arrangement of a brake control device in accordance with one embodiment of the present invention.

As shown in FIG. 1, the brake control device of the present invention includes a brake pedal 1, a load cell 2, a master cylinder 3, a sensor unit 4, and an electronic control unit 5. The brake control device also includes a fail-safe selector valve 6 which is closed in case of fail-safe operation. In addition, two-position type selector valves 7 and 8 are included for closing hydraulic fluid paths in the case of operation of an electric brake. A right front wheel braking device 10, a left front wheel braking device 11, a right rear wheel braking device 12, and a left rear wheel braking device 13 are shown each including a wheel speed sensor S for detecting the speed of each wheel. In addition, hydraulic pressure sensors are attached to the right and left front wheel braking devices 10 and 11 for detecting the hydraulic pressure of the brake of the right and the left wheels. As shown in FIG. 1, the above components are connected by hydraulic piping shown as bold solid lines and also connected by electric signal wires shown as dotted lines.

The sensor unit 4 is provided with a piston 4c arranged in a cylinder 4a formed in the sensor body. A hydraulic pressure chamber 4b is formed in a portion of the cylinder 4a partitioned by the piston 4c. The piston 4c is pushed toward the hydraulic pressure chamber 4b by a spring 4d at all times. The hydraulic pressure chamber 4b is connected with the fail-safe selector valve 6 via an orifice 4e. Two pressure sensors 4f and 4g are provided for detecting a difference in hydraulic pressure before and after the orifice 4e. Hydraulic pressure signals before and after the orifice 4e are sent to the electronic control unit 5 by these two pressure sensors 4f and 4g.

Figure 2:
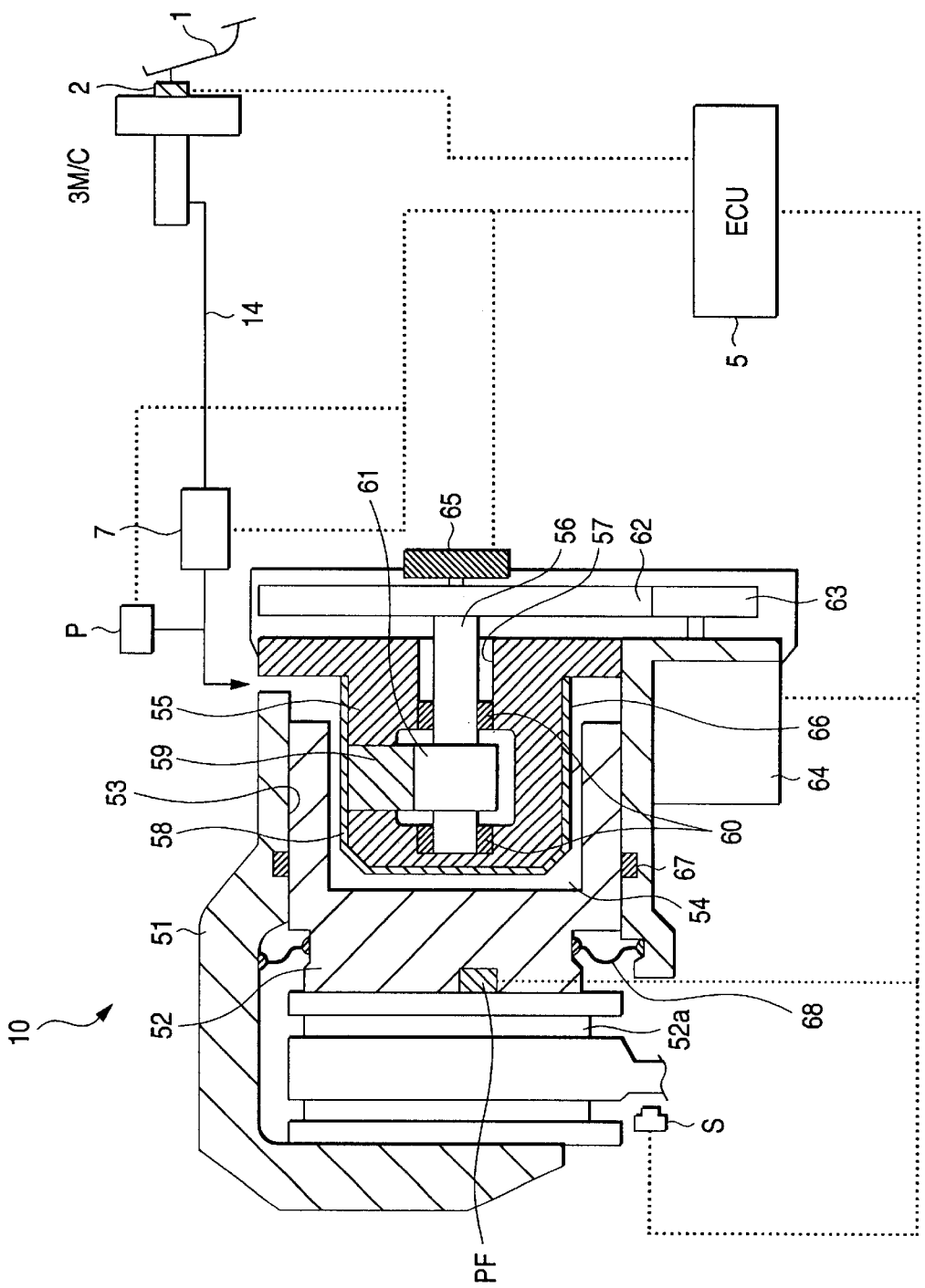
FIG. 2 is an enlarged view of a front wheel system of the brake control device of the embodiment of the present invention.

Next, the braking device in the front wheel system will be explained below. The structure of the right front wheel braking device 10 and that of the left front wheel braking device 11 are the same. They are similar to the braking device disclosed in Japanese Unexamined Patent Publication 9-323630 which was proposed by the present applicant. Referring to FIG. 2, the structure of the front wheel braking device 10 will be briefly explained.

FIG. 2 is an enlarged cross-sectional view of the front wheel braking device 10. As shown in FIG. 2, the front wheel braking device 10 includes a brake caliper 51, and a brake piston 52 slidably arranged in a cylinder 53 formed in the caliper 51 in a sealed condition. A hydraulic pressure chamber 54 is formed by the cylinder 53, the brake piston 52 and a cam case 55 which will be described later. This hydraulic pressure chamber 54 is communicate with a master cylinder 3, which is a hydraulic pressure generating source, via a two-position selector valve 7 arranged in a piping 14. A brake friction pad 52a and a pad pushing pressure sensor PF are attached to the brake piston 52.

In the hydraulic pressure chamber 54, the cam case 55 is fixed to the caliper 51 by an appropriate fixing means such as bolts in a sealed condition. At a center of the cam case 55, there is formed a long hole 57 in which a cam shaft 56 is arranged. A cylinder 58 communicates with this long hole 57. In the cylinder 58, a pressure governing piston 59 is provided.

In the long hole 57 at the center of the cam case 55, the cam shaft 56 is supported by bearings 60. On the cam shaft 56, there is provided a cam 61 corresponding to the cylinder 58.

The cam 61 comes into contact with the pressure governing piston 59. A surface of the cam 61 is formed in such a shape so that its radius is gradually increased from the center of the cam shaft 56. When the maximum radius of the cam 61 is at the contact position with the pressure governing piston 59, it is possible to obtain the maximum protruding stroke of the pressure governing piston 59. In the periphery of the cam case 55, a flexible boot 66 is provided to prevent the hydraulic fluid accommodated in the hydraulic pressure chamber 54 from leaking out from the cylinder 58 to the cam shaft side.

A large gear 62 is fixed to an end portion of the cam shaft 56. This large gear 62 is meshed with a pinion 63 attached to an output shaft of an electric motor 64. This arrangement forms a cam drive mechanism. Further, a potentiometer 65 is fixed to the large gear 62. A rotary angle (positional information) of the cam shaft 56 can be detected by this potentiometer 65. A piston seal 67 and a sealing member 68 are also provided. Due to its elasticity, the piston seal 67 performs the function of returning the brake piston to its initial position when the brake is released.

In this braking device, when the electric motor 64 is operated and the cam shaft 56 is rotated, the pressure governing piston 59, which comes into contact with the cam 61, is protruded from and retracted into the cylinder 58 by the action of the cam 61. Due to the above motion of the pressure governing piston 59, the volume of the hydraulic pressure chamber 54 is increased and decreased. Therefore, hydraulic pressure in the hydraulic pressure chamber is accordingly raised and reduced. In this connection, the boot 66 is deformed in accordance with the movement of the pressure governing piston 59.

In this braking device, a wheel speed sensor S is used for detecting a wheel speed, a hydraulic pressure sensor P is used for detecting the hydraulic pressure in the hydraulic pressure chamber 54, and a brake friction pad pushing force sensor PF is used for detecting the pushing force of the brake friction pad. All these sensors are used for controlling the brake force given by the braking device, and they are electrically connected with the electronic control unit 5. According to signals sent from the potentiometer 65, the wheel speed sensor S, the hydraulic pressure sensor P, the brake friction pad pushing force sensor PF and the load cell 2, which are shown in FIG. 2, and also according to various sensors not shown in the drawing, the electronic control unit 5 controls the electric motor 64. At the same time, the electronic control unit 5 operates the two-position selector valve 7 so that the hydraulic pressure of the brake is controlled according to an embodiment to be described later.

In FIG. 1, the braking devices 12 and 13 for the right and the left rear wheels are well-known electrically operated brakes, similar to those disclosed in Japanese Unexamined Patent Publication No. 3-41233 mentioned in the Background section. When the electric motor, which is built in the braking device, is driven by a signal sent from the electronic control unit, the brake friction pad is pushed against a brake disk via a conversion means for converting a rotary motion into a linear motion, so that a brake force can be obtained. In the braking devices 12 and 13 of the right and the left rear wheel, wheel speed sensors S are provided as shown in FIG. 1. Therefore, wheel speed signals are sent to the electronic control unit 5 by the sensors S.

In the brake system of the present invention as shown in FIG. 1, when the brake pedal 1 is stepped on and this stepping force is inputted into the electronic control unit 5 from the load cell 2, the electronic control unit 5 changes the two-position selector valves 7 and 8 into a condition in which the hydraulic path is closed. At the same time, the electronic control unit 5 changes the fail-safe selector valve 6 into a condition in which the hydraulic path is opened as shown in FIG. 1. Also, the electric motor 64 of the braking device in the front wheel brake system and the electric motor of the braking device in the rear wheel brake system are operated by the electronic control unit 5.

In the front wheel brake system as shown in FIG. 2, the cam shaft 56 is rotated by the drive of the electric motor 64 via the pinion 63 and the large gear 62. When the cam shaft 56 is rotated, the cam 61 is rotated. In accordance with the rotation of the cam 61, the pressure governing piston 59 protrudes from the cylinder 58 into the hydraulic pressure chamber 54. As a result, the hydraulic pressure in the hydraulic pressure chamber 54 is raised, and the brake piston 52 is moved to the left in FIG. 2, so that the brake of the front wheel can be applied. Control of the brake force of the front wheel is conducted according to the stepping force detected by the load cell 2 to be described later. When the brake pedal is released and no signal is sent out from the load cell, the electric motor returns to its initial position. Due to the foregoing, the pressure governing piston also returns to the initial position. As a result, the brake pressure is released.

In the rear wheel braking system, an electric motor not shown in the drawing is driven, and the brake friction pad is pushed against the brake disk via the conversion means, thus converting a rotary motion into a linear motion. As a result, a brake force is applied. In the front wheel braking system, brake force is controlled so that the rear wheel can follow the wheel speed of the front wheel in the manner to be described later.

In this connection, when the brakes are operated, two-position selector valves 7 and 8 are closed, and at the same time the fail-safe selector valve 6 is opened. Accordingly, brake fluid sent from the master cylinder 3 flows into the hydraulic fluid chamber 4b via the orifice 4e of the sensor unit 4, and the piston 4c is moved to the right in FIG. 1 while the spring 4d is compressed by the action of brake fluid. In this way, brake fluid sent from the master cylinder 3 is absorbed into the hydraulic fluid chamber 4b. As a result, when the brake pedal is applied, it is possible to obtain the same brake feeling as that of the conventional hydraulic pressure type braking device.

Figure 3A:
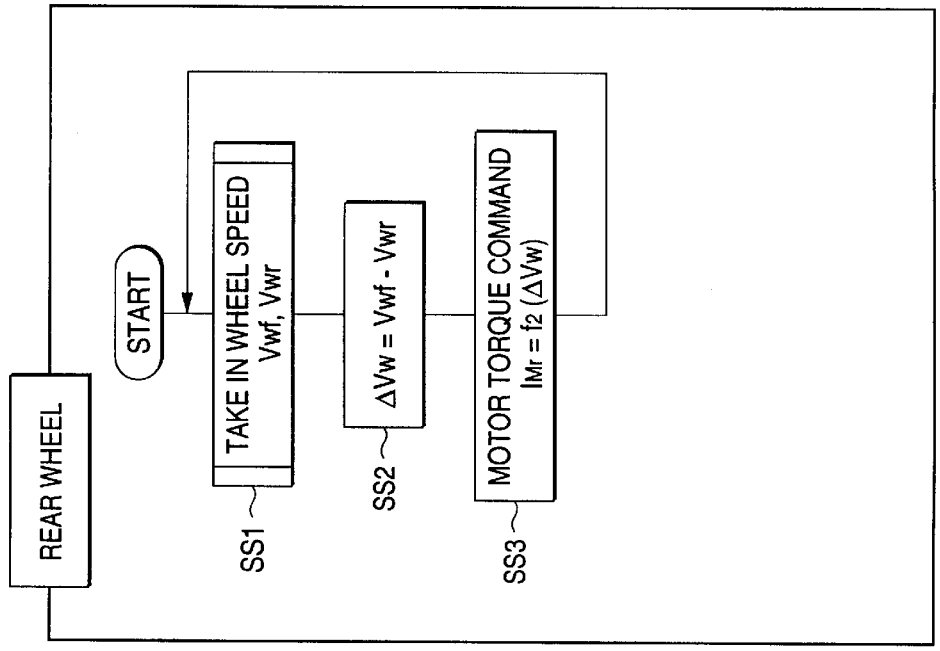
FIG. 3A is a flow chart for brake control of the front wheel system.
Figure 3B:
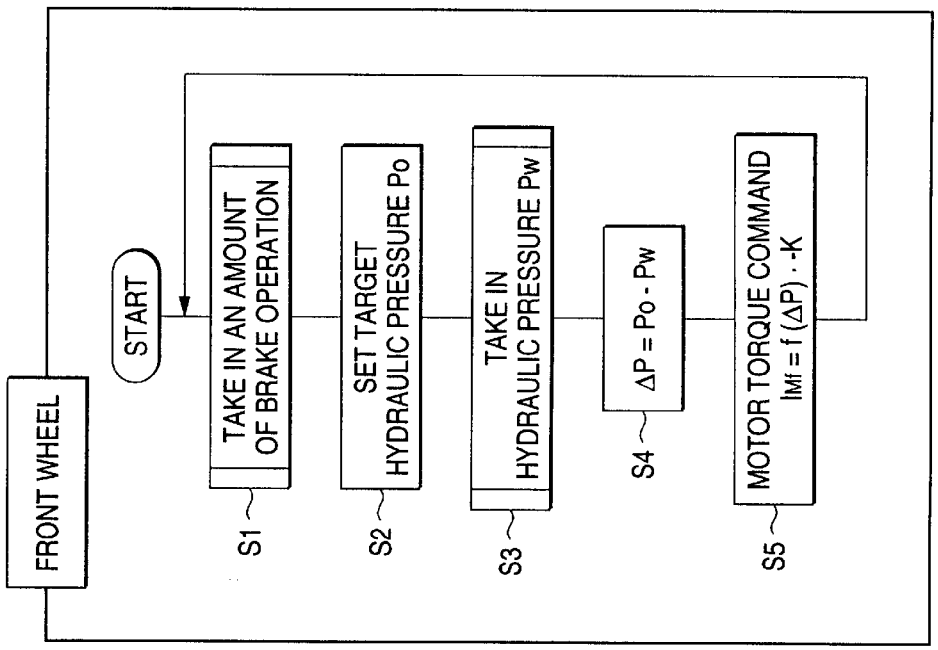
FIG. 3B is a flow chart for brake control of the rear wheel system.

FIGS. 3A and 3B are flow charts showing the steps of controlling the front wheel system and the rear wheel system in accordance with the present invention. Referring to the flow chart shown in FIGS. 3A and 3B, the brake control of the front and the rear wheels will be explained below.

The brake control of the front wheel is shown in FIG. 3A. When the brake pedal 1 is stepped on, the program is started. In step S1, the electronic control unit 5 detects the brake pedal stepping force (amount of brake pedal operation) with the load cell 2. In step S2, a target hydraulic pressure $P_o$ corresponding to a signal sent from the load cell 2 is determined. This target hydraulic pressure $P_o$ is found from a relation map between an amount of brake pedal operation, which is previously stored in the electronic control unit, and a target hydraulic pressure $P_o$. Alternatively, this target hydraulic pressure $P_o$ is calculated from a relational expression, which is previously established, between an amount of brake pedal operation and a target hydraulic pressure $P_o$.

In step S3, the actual brake fluid pressure $P_w$ of the front wheel is determined. In step S4, a difference $(\Delta P = P_o - P_w)$ between the target hydraulic pressure $P_o$ and the actual hydraulic pressure $P_w$ of the brake is calculated. In step S5, a torque of the electric motor 64 in the front wheel braking device is controlled by the expression of $I_{MF} = f(\Delta P) \cdot k$ so that the difference can be zero. In the above expression of $I_{MF} = f(\Delta P) \cdot k$, $I_{MF}$ is an electric current supplied to the electric motor 64, and k is a constant used as a correction value.

When the torque of the electric motor is controlled in step S5, a difference in the hydraulic pressure between before and after the orifice 4e in the sensor unit 4 is detected by the pressure sensors 4f and 4g. When this difference in hydraulic pressure is large, it is judged that the brake pedal stepping speed is high and an urgent braking operation is required. Therefore, a motor torque command is changed to a correction value K which is higher. In this way, it is possible to apply the brake urgently.

As described above, for the front wheel system, it is possible to obtain a brake force corresponding to the stepping force (or stepping speed) on the brake pedal.

Also, for the front wheel brake, it is possible to conduct brake control according to the brake friction pad pushing force instead of the brake hydraulic pressure $P_w$ as described above. In this case, the target brake friction pad pushing force is first determined corresponding to an amount of brake pedal operation. Further, the actual brake friction pad pushing force is found. The torque of the electric motor 64 in the front wheel brake device is controlled so that a difference between the target brake friction pad pushing force and the actual brake friction pad pushing force becomes zero in the same manner as described above. The amount of stepping on the brake pedal, that is, the amount of brake pedal operation, may be detected by using an additional sensor such as a position detecting sensor.

The brake control of the rear wheel is shown in FIG. 3B. When the program of brake control is started, an average value $V_{wf}$ of the actual wheel speed on the front wheel and an average value $V_{wr}$ of the actual wheel speed on the rear wheel are obtained from wheel speed sensors S in step SS1. In step SS2, the difference $(\Delta V_w = V_{wf} - V_{wr})$ between the actual wheel speed of the front wheel and the actual wheel speed of the rear wheel is calculated. In step SS3, a torque of the electric motor in the electrically operated braking device of the rear wheel is controlled according to the expression of $I_{MF} = f_2(\Delta Vw)$ so that the difference becomes zero. In other words, the average value of the actual wheel speed of the rear wheel should coincide with the average value of the actual wheel speed of the front wheel.

In the above example, the average value is used as the actual wheel speed on the front and the rear wheels. It is also possible to control the brake system by using the maximum wheel speeds on the front and the rear wheels or the minimum wheel speeds on the front and the rear wheels.

Figure 4:
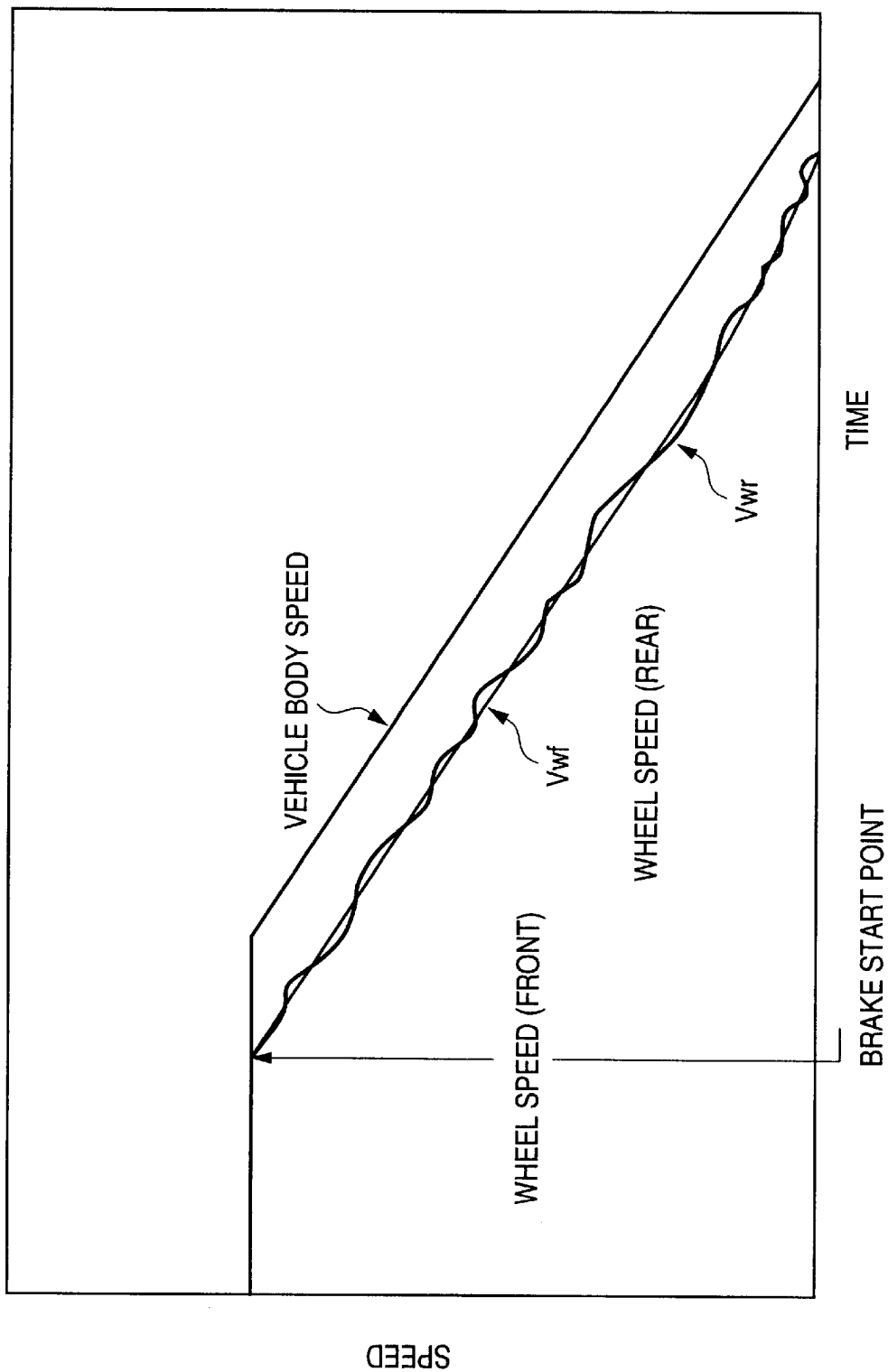
FIG. 4 is a diagram showing the relationship of the wheel speed during a braking operation in the front wheel system and the rear wheel system of the brake control device of the present invention.

FIG. 4 is a diagram showing the relationship between the wheel speed of the front wheel system and that of the rear wheel system during a brake operation. As shown in FIG. 4, the wheel speed of the rear wheel follows the wheel speed of the front wheel.

As can be seen in FIG. 4, when the wheel speed $V_{wf}$ of the front wheel is decreased from the starting point of braking operation, the wheel speed $V_{wr}$ of the rear wheel is also decreased while it is following the wheel speed of the front wheel. As described above, while the wheel speed of the rear wheel is following the wheel speed of the front wheel at all times, the brake force can be controlled. Therefore, on the rear wheel side, it is unnecessary to provide an encoder for detecting a rotary angle of the electric motor, and also it is unnecessary to provide a hydraulic pressure sensor or a brake friction pad pushing force sensor. Accordingly, it is possible to provide an inexpensive electrically operated braking device with a simple structure in accordance with the present invention.

When the electric system of the above braking device is out of order, the fail-safe selector valve 6 is closed and the two-position selector valves 7 and 8 are opened. As a result, the hydraulic pressure of the master cylinder 3 is directly transmitted to the hydraulic pressure chamber 54 of the braking device in the front wheel braking system. Therefore, a brake force can be obtained by the braking device in the front wheel braking system.

Accordingly, in the above embodiment, anti-lock control, automatic brake control and traction control can be easily achieved by a command sent from the electronic control unit 5 when a sensor for detecting a distance between vehicles (for example, the distance between the present vehicle and another vehicle which is directly in front of the present vehicle) or a sensor for detecting wheel speed is utilized. Various measurement values such as the hydraulic pressure, the wheel speed and the brake friction pad pushing force can be used as target values and also as actually measured values corresponding to an amount of brake operation of the front wheel braking system.

As described above, the present invention has the following advantages. In a brake system including a front wheel system and a rear wheel system, the brake force is generated and controlled corresponding to the operation force of a brake pedal in the front wheel brake system. In the rear wheel brake system, a feedback control is conducted by utilizing a wheel speed sensor so that the wheel speed of the rear wheel follows the wheel speed of the front wheel. Consequently, it is unnecessary to provide a brake friction pad pushing force sensor and a hydraulic pressure sensor in the brake system of the rear wheel, even though these sensors are required in the front wheel system. Therefore, the cost of the overall braking system is reduced. Since the rear wheel braking system is subjected to the feedback control by utilizing the brake operating condition of the front wheel conducted by hydraulic pressure, it is possible to obtain a brake which feels similar to the commonly used hydraulic oil pressure brake. Since the sensor unit is provided in the hydraulic pressure circuit, it is possible to avoid the feeling of stepping on a board when a driver steps on the brake pedal. Further, a brake control can be carried out in accordance with the brake pedal stepping speed.

It will be apparent to those skilled in the art that various modifications and variations can be made in the method of controlling brake force of the present invention without departing from the spirit or scope of the invention. Thus, it is intended that the present invention cover the modifications and variations of this invention provided they come within the scope of the appended claims and their equivalents.

What is claimed is:

1. A method of controlling a brake force in a brake system including a front wheel system and a rear wheel system, comprising the steps of:

operating a brake in the front wheel system by using a hydraulic pressure corresponding to an amount of brake pedal operation; and controlling a wheel speed of the rear wheel system via a feedback mechanism to match a wheel speed of the front wheel system, wherein the step of operating a brake in the front wheel system further comprises the steps of:

setting a target hydraulic pressure of the brake corresponding to the amount of brake pedal operation;

measuring an actual hydraulic pressure of the brake;

calculating a pressure difference between the target hydraulic pressure and the actual hydraulic pressure; and controlling the brake of the front wheel system so that the pressure difference becomes zero.

2. The method of claim 1, wherein the target hydraulic pressure is determined from a relationship map between the amount of brake pedal operation and the target hydraulic pressure.

3. A method of controlling a brake force in a brake system including a front wheel system and a rear wheel system, comprising the steps of:

setting a target hydraulic pressure $P_o$ of a brake in the front wheel system corresponding to an amount of application of a brake pedal;

determining an actual hydraulic pressure $P_w$ of the brake in the front wheel system;

calculating a pressure difference ($\Delta P = P_o - P_w$) between the target hydraulic pressure $P_o$ and the actual hydraulic pressure $P_w$;

controlling the brake force of the front wheel system so that the pressure difference become zero;

measuring an actual wheel speed $V_{wf}$ of the front wheel system and an actual wheel speed $V_{wr}$ of the rear wheel system; and controlling the brake force of the rear wheel system so that a speed difference ($\Delta V w = V_{wf} - V_{wr}$) between the actual wheel speed of the front wheel system and the actual wheel speed of the rear wheel system becomes zero.

4. The method of claim 3, wherein the target hydraulic pressure is determined from a relationship map between the amount of application of the brake pedal and the target hydraulic pressure.

5. The method of claim 3, wherein the step of controlling the brake force of the front wheel includes the step of applying a torque of an electric motor to the brake of the front wheel system.

6. The method of claim 3, wherein the step of controlling the brake force of the rear wheel system includes the step of applying a torque of an electric motor to a brake friction pad of the rear wheel system.

7. A method of controlling a brake force in a brake system including a front wheel system and a rear wheel system, comprising the steps of:

operating a brake in the front wheel system by using a measurable parameter; and controlling a wheel speed of the rear wheel system via a feedback mechanism to match a wheel speed of the front wheel system, wherein the step of operating a brake in the front wheel system includes the step of using a hydraulic pressure corresponding to a desired amount of brake pedal operation to operate the brake in the front wheel system, wherein the step of operating a brake in the front wheel system further includes the steps of:

setting a target hydraulic pressure of the brake corresponding to the desired amount of brake pedal operation;

measuring an actual hydraulic pressure of the brake;

calculating a pressure difference between the target hydraulic pressure and the actual hydraulic pressure; and controlling the brake of the front wheel system so that the pressure difference becomes zero.

8. A method of controlling a brake force in a brake system including a front wheel system and a rear wheel system, comprising the steps of:

operating a brake in the front wheel system by using a measurable parameter; and controlling a wheel speed of the rear wheel system via a feedback mechanism to match a wheel speed of the front wheel system, wherein the step of operating a brake in the front wheel system includes the step of measuring a brake friction pad pushing force corresponding to a desired amount of brake pedal operation to operate the brake in the front wheel system.

9. The method of claim 8, wherein the step of operating a brake in the front wheel system further includes the steps of:

setting a target brake friction pad pushing force corresponding to the desired amount of brake pedal operation;

measuring an actual brake friction pad pushing force of the brake;

calculating a pushing force difference between the target friction pad pushing force and the actual brake friction pad pushing force; and controlling the brake of the front wheel system so that the pushing force difference becomes zero.

10. A method of controlling a brake force in a brake system including a front wheel system and a rear wheel system, comprising the steps of:

operating a brake in the front wheel system by using a measurable parameter; and controlling a wheel speed of the rear wheel system via a feedback mechanism to match a wheel speed of the front wheel system, wherein the step of operating a brake in the front wheel system includes the step of using a measured wheel speed compared to a desired speed chosen by a driver to operate the brake in the front wheel system, thus achieving automatic brake control.

11. The method of claim 10, wherein the step of operating a brake in the front wheel system further includes the steps of:

setting the desired speed for traveling;

measuring an actual speed of the front wheel system;

calculating a speed difference between the desired and the actual speed; and controlling the brake of the front wheel system so that the speed difference becomes zero.

* * * * *